United States Patent [19]

Wilkinson et al.

[11] Patent Number: 4,643,126
[45] Date of Patent: Feb. 17, 1987

[54] METHOD AND APPARATUS FOR IMPREGNATING FIBER STRANDS

[75] Inventors: Robert E. Wilkinson, Birmingham; Joseph N. Epel, Southfield, both of Mich.

[73] Assignee: The Budd Company, Troy, Mich.

[21] Appl. No.: 673,904

[22] Filed: Nov. 21, 1984

[51] Int. Cl.⁴ .............................................. B05C 3/02
[52] U.S. Cl. ................... 118/405; 118/410; 118/420; 427/434.4
[58] Field of Search .......... 427/434.4, 434.7; 118/405, 410, 420

[56] References Cited

U.S. PATENT DOCUMENTS

| | | | |
|---|---|---|---|
| 2,539,549 | 1/1951 | Rayburn | 118/420 |
| 3,042,570 | 7/1962 | Bradt | 118/405 |
| 3,150,026 | 9/1964 | Talv | 118/405 |
| 3,471,322 | 10/1969 | Medney | 118/405 |
| 3,473,513 | 10/1969 | Paul | 118/405 |
| 3,480,499 | 11/1969 | Paul | 118/405 |
| 3,503,371 | 3/1970 | Meyers | 118/405 |
| 4,167,429 | 9/1979 | Ackley | 118/420 |
| 4,220,496 | 9/1980 | Carley et al. | 156/174 |
| 4,220,497 | 9/1980 | Carley | 156/174 |
| 4,294,490 | 10/1981 | Woelfel | 301/63 |
| 4,294,639 | 10/1981 | Woelfel et al. | 156/185 |
| 4,376,749 | 3/1983 | Woelfel | 264/258 |

FOREIGN PATENT DOCUMENTS 903178  2/1982  U.S.S.R. ................ 427/434.4

Primary Examiner—Richard Bueker
Attorney, Agent, or Firm—Harness, Dickey & Pierce

[57] ABSTRACT

A method and apparatus for impregnating strands of fibers with resin are disclosed. The resin is recirculated through the interior of a substantially closed container. The strands are pulled through the interior of the container in essentially a straight line manner. The fibers in each strand are spread by running them across a plurality of transversely extending bars in the interior of the container while the fibers are immersed in the resin.

1 Claim, 3 Drawing Figures

METHOD AND APPARATUS FOR IMPREGNATING FIBER STRANDS

TECHNICAL FIELD

This invention relates to fiber reinforced plastics and, more particularly, to methods and apparatus for impregnating the fibers with resin.

BACKGROUND ART

Charges of fiber reinforced plastic resin are used in the formation of a wide variety of articles. These charges may take the form of one or more sheets of sheet molding compound (SMC) material, various compositions of bulk molding compound material, and in some instances the charge may contain resin impregnated fiber strands in combination with plies of SMC material or the like. Various other charge compositions are known in the art. Typically, the charge is compression molded between two heated dies for a sufficient period of time to allow the resin to cure. The dies are then opened and the part removed.

In general, higher quality parts can be molded from charges where the resin has uniformly impregnated the fibers, while keeping the amount of air and other debris which may become entrapped in the charge to a minimum. The following patents comprise a representative, though not exhaustive, list of known techniques for impregnating reinforcing fibers with resin:

U.S. Pat. No. 4,220,496 to Carley et al;
U.S. Pat. No. 4,220,497 to Carley;
U.S. Pat. No. 4,294,490 to Woelfel;
U.S. Pat. No. 4,294,639 to Woelfel et al; and
U.S. Pat. No. 4,376,749 to Woelfel.

These patents disclose the use of an "open cell" bath to impregnate the reinforcing fibers with resin. These open cell bath constructions are generally characterized by a coverless trough holding the resin. The fibers enter the trough and are bent at a substantial angle by one or more rods which attempt to keep the fiber strands submerged in the bath of resin as they are pulled therethrough.

Open cell constructions such as these have several drawbacks. Air has a tendency to become introduced into the resin bath during operation. This air can become or remain entrapped between the fibers of each strand. As noted above, entrapped air within the charge can degrade the quality of the finished part. Another problem with the open cell constructions is that a wave of resin tends to be created toward the exit of the cell as the fibers are drawn through it. Consequently, the fibers entering the cell may not be submerged in the resin and it becomes difficult to control the length of time that the fibers are actually being impregnated with the resin. The resin characteristics are sometimes difficult to control using the prior art cells, as is the removal of frayed fibers or other contaminants. In addition, the rather substantial degree of bending of the fibers in the known cells has a tendency to fray the more fragile fibers such as graphite and glass. The frayed fibers add to the contaminants in the resin bath and can degrade the structural integrity of the fibers in the finished part.

Those skilled in the art are most likely aware of still other problems with the open cell constructions which are common in the industry.

SUMMARY OF THE INVENTION

According to the method of this invention, resin is recirculated through the interior of a substantially closed container through which the strands of fibers pass and are impregnated with the resin. The strands are pulled through the interior of the container in essentially a straight line. The fibers are spread by running the strands across a plurality of transversely extending bars in the interior of the container. In such manner, the fibers are uniformly impregnated with the resin while minimizing air entrapment and bending of the fibers which cause some of the problems with the prior art constructions as noted above.

The apparatus of the preferred embodiment of the invention includes a substantially closed container having a top and a bottom defining a hollow interior region therebetween. An inlet is formed in one side of the container through which the strands enter. An outlet on the opposite side of the container is arranged so as to permit the strands to pass through the interior in essentially a straight line. Means are provided for recirculating the resin through the interior of the container and provision is made for spreading the fibers in the strands while submerged in the recirculating resin.

By using a covered, as compared to an open, cell it allows a recirculating pump to be employed to pump de-aerated resin into one end of the cell while drawing off air-entrained resin from an opposite end. In the disclosed embodiment, the resin is drained from the cell into a holding tank or the like where the air is allowed to rise to the top while de-aerated resin can be pumped from the bottom of the tank for supplying it to the interior of the cell. The closed cell approach of this invention also essentially eliminates the creation of the wave of resin experienced in the prior art approaches. As a result, the fibers are uniformly impregnated in a relatively easy to control manner. Resin characteristics can be readily controlled for such things as viscosity build (time factor) by utilizing continuous or intermittent mixed resin feeds to the recirculating system. Since the fibers are preferably drawn through the cell in a straight line manner, this minimizes the amount of fiber bending which can have a tendency to fray the fibers. Any contaminants that are produced can be readily removed by the use of a screen or filter within the recirculating resin system.

BRIEF DESCRIPTION OF THE DRAWINGS

Still other advantages of the present invention will become apparent to one skilled in the art upon reading the following specification and by reference to the drawings in which.

DESCRIPTION OF THE PREFERRED EMBODIMENT

Figure 1:
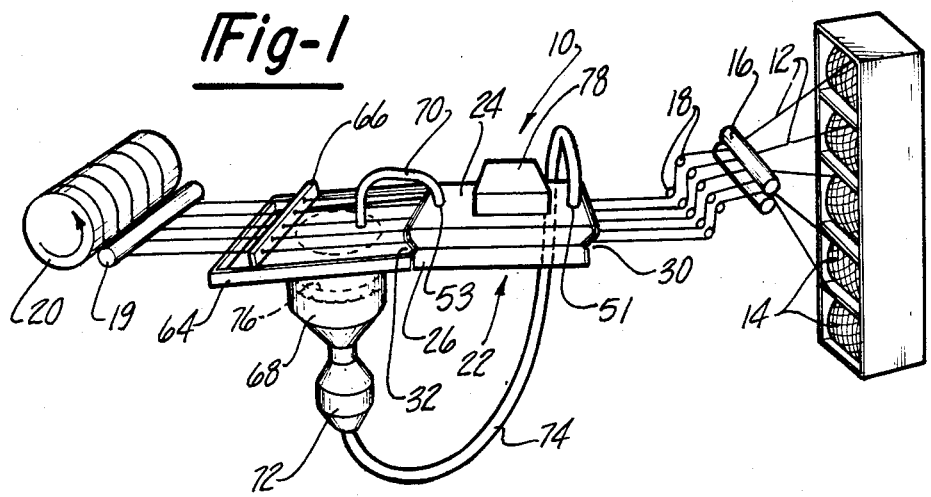
FIG. 1 is a perspective view of the apparatus of a preferred embodiment of this invention.

The apparatus 10 is designed to impregnate fiber strands 12 with resin so that the resin impregnated strands can be used as a charge for molding a finished part. Each strand 12 contains a plurality of individual fiber filaments. The fiber composition may vary considerably and includes polyimide fibers, polyester fibers, polyamide fibers, natural fibers and metal fibers. Preferred fibers for the instant invention are glass fibers and carbon fibers as these materials result in high strength properties. An optimum material has been found to be glass fibers. However, any fiber may be used which results in a composite of high strength and possesses the integrity necessary for it to be pulled through the resin impregnating bath.

Similarly, the resin may be any material that provides the necessary bonding and strength for the composite article to be formed. Among typical resins are polyaramids, novalacs, and alkyds. Perhaps even more suited for the instant invention include vinyl esters, epoxy resins, polyurethanes, and polyesters. Preferred resin materials are thermally cured polyester resins as these materials provide a high strength composite and give reasonable shelf life to the composite prior to their curing during the heat and pressure formation of the composite.

The strands 12 can be fed through the resin impregnating apparatus 10 in any convenient manner. Typically, the strands are fed from packages 14 through rods 16 and combs 18 through apparatus 10 under the action of a rotating member 20 on the opposite side of apparatus 10 around which the strands are partially wrapped through the aid of rod 19. The resin impregnated fibers can then be used to make a wide variety of different charges for forming composite parts.

Figure 2:
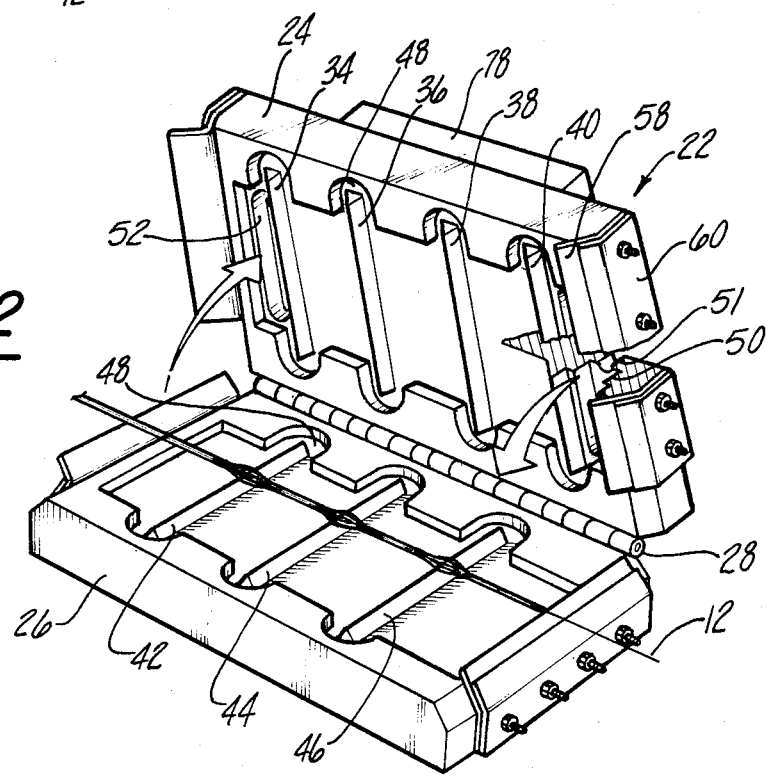
FIG. 2 is a perspective view of the cell construction, with the top being shown in an open position to aid in the illustration of the parts therein.
Figure 3:
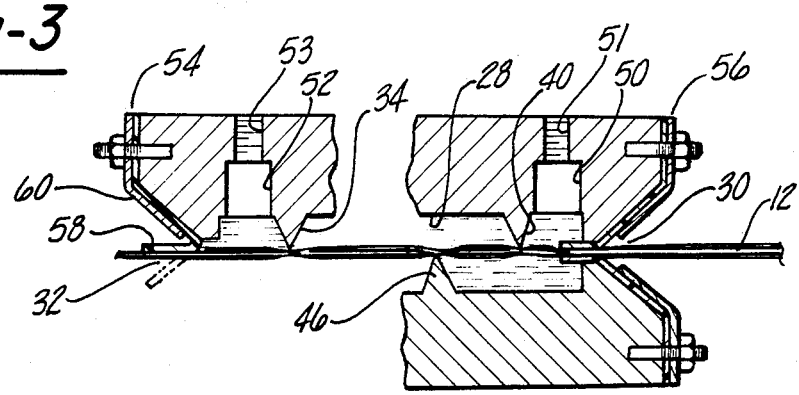
FIG. 3 is a fragmented cross-sectional view of the cell shown in FIG. 2 with the top closed.

Apparatus 10 includes a wet-out cell 22 having a top 24 and a bottom 26 pivotally connected along one side by hinge 27. When in use, the top 24 and bottom 26 are clamped together so as to form a substantially closed container as shown in FIGS. 1 and 3. Opposing interior surfaces of the top and bottom have portions that are recessed so as to define a hollowed-out interior region 28 for the cell when it is closed. An inlet 30 is formed in one side of the cell through which the strands 12 enter. An outlet 32 is formed on the other side of the cell and it is arranged so as to permit the strands 12 to pass through the interior 28 in essentially a straight line. A plurality of triangular-shaped bars alternately extend from the top 24 and bottom 26 along the path of travel of the strands 12. As can be seen most clearly in FIGS. 2 and 3, bars 34, 36, 38 and 40 extend downwardly from top 24, with their apexes ending at about the center line of interior region 28. Analogously bars 42, 44 and 46 extend upwardly from bottom 26 but are laterally spaced from the bars 34-40. The ends of the bars 34-46 are spaced from associated U-shaped passageways generally designated by the numeral 48. The resin is introduced into the interior 28 via an inlet port 51 opening into a slot 50, with the resin recirculating through the cell until it exits via slot 52 and outlet port 53.

End seals 54 and 56 are employed to keep the resin within the interior 28. Each seal consists of a flexible wiper blade 58 which is clamped in place by a formed sheet metal covering 60. Preferably, blade 58 is made of Teflon plastic for lubricity and resistance to chemical degradation.

Referring to FIG. 1, a pan 64 adjacent exit 32 is used to collect excess resin from the strands 12 as they emerge from cell 22. Close tolerance metering orifices 66 are used to meter the correct amount of resin on each strand of fibers. The resin drained from orifices 66 and from the wiper seals at exit 32 are drained into a holding tank 68. In addition, recirculating resin is carried by hose 70 from outlet port 53 into holding tank 68. The rate of flow of the recirculating resin and the volume of tank 68 is such that the resin exiting cell 22 is allowed to accumulate in tank 68 for a sufficient period of time to allow air entrained therein to rise to the top of the tank and become removed from the resin. Then, the deaerated resin is pumped from the bottom of tank 68 by pump 72 through hose 74 back to the inlet 51 of the cell 22. In this manner, resin is recirculated through a substantially closed loop system that includes means for removing air from the resin before it is pumped back into the cell 22 for impregnating the strands 12. A filter such as a screen schematically illustrated at 76 is advantageously employed in the recirculating system to remove contaminants such as debris and the like from the resin. Filter 76 can be removed and cleaned periodically.

Preferably, cell 22 is constructed to allow for temperature control so that the resin will be at the optimum temperature for processing. For example, the cell may include a heater 78 for heating the resin.

In operation, the top 24 of the cell 22 is opened so that the fiber strands 12 can be threaded through combs 18 across the cell 22 through metering orifices 66 and wrapped around rotating member 20. Comb 18 is preferably adjustable so as to maintain the strands 12 in a generally taut condition as they pass through the cell 22. The top 24 is closed and the pump 72 actuated to begin recirculating the resin through the interior 28 of the cell. The impregnation process begins when the rotating member 20 or other device begins to pull the continuous raw fiber strands through the cell.

As can be seen most clearly in FIG. 3, the bars 34–46 provide a slight contact on the fiber strands 12. The bars 34–46 displace the fiber strands 12 from their normally straight line path of travel by sufficient distance to cause spreading of the individual fibers in each strand. Bending of the fibers should be kept to a minimum to prevent fraying of the fibers while at the same time it has been found to be preferable to spread the individual fibers so that the resin can uniformly impregnate them. Using smooth bars made of relatively hard material such as chrome-plated steel or tungsten carbide accomplishes this function very well. Preferably, the bars 34–46 displace the strands 12 by no more than 0.25 inch and, most preferably, by less than 0.060 inch.

The circulation of the resin is controlled so that the resin always substantially fills the entire interior 28 of cell 22. The closed cell construction of the present invention substantially eliminates the creation of a wave towards the exit 32 and, therefore, the fibers remain consistently immersed in the resin for a controlled period of time. The impregnated fiber strands exit the cell 22 and the metering orifices 66 provide a final control for insuring that the correct amount of resin remains on the fibers. The fibers then can be used in a variety of manners to form a charge that can be used, for example, in forming a composite article by compression molding techniques.

While this invention has been described in connection with a particular example thereof, various other modifications will become apparent to the skilled practitioner upon a study of the specification and drawings and claims.

We claim:

1. Apparatus for impregnating strands of fibers with resin, said apparatus comprising:
   a substantially closed container having a top and a bottom defining a hollow interior region therebetween, an inlet in one side of the container through which the strands enter, and an outlet on an opposite side of the container arranged so as to permit the strands to pass through the interior in essentially a straight line;

a plurality of metering orifices adjacent the outlet of the container through which the resin impregnated strands pass;

collector means disposed beneath the metering orifices for collecting excess resin;

a holding tank into which resin from the collecting means drains, operative to maintain the resin therein for a sufficient period of time to allow air entrapped in the resin to be removed;

first means for recirculating resin through the interior of the container in such a manner so as to keep the interior substantially filled with resin, said first means including an outlet port through which resin from the interior of the container exits, means connected to the outlet for de-aerating the resin and pumping means for pumping the de-aerated resin to an inlet port for supplying the resin to the interior of the container;

a plurality of transversely extending bars alternately extending from the top and bottom of said container along the path of travel of the strands, said bars having a triangular shape having an apex, with the strands contacting the apex of the bars serving to disturb the normally straight line path of travel of the strands by no more than about 0.250 inch thereby spreading the fibers in the strands while submerged in the recirculating resin whereby the strands are uniformly impregnated with the resin while minimizing air entrapment and bending of the fibers.

* * * * *